United States Patent
Chen et al.

(10) Patent No.: US 11,194,073 B2
(45) Date of Patent: Dec. 7, 2021

(54) MILLIMETER WAVE IMAGE BASED HUMAN BODY FOREIGN OBJECT DETECTION METHOD AND SYSTEM

(71) Applicants: CHINA COMMUNICATION TECHNOLOGY CO., LTD., Guangdong (CN); Shenzhen Institute of Terahertz Technology and Innovation, Guangdong (CN)

(72) Inventors: Hanjiang Chen, Guangdong (CN); Zhiquan Li, Guangdong (CN); Chunchao Qi, Guangdong (CN); Shukai Zhao, Guangdong (CN)

(73) Assignees: CHINA COMMUNICATION TECHNOLOGY CO., LTD., Shenzhen (CN); Shenzhen Institute of Terahertz Technology and Innovation, Shenzhen (CN)

(*) Notice: Subject to any disclaimer, the term of this patent is extended or adjusted under 35 U.S.C. 154(b) by 282 days.

(21) Appl. No.: 16/336,772

(22) PCT Filed: Aug. 4, 2017

(86) PCT No.: PCT/CN2017/096101
§ 371 (c)(1),
(2) Date: Mar. 26, 2019

(87) PCT Pub. No.: WO2018/059125
PCT Pub. Date: Apr. 5, 2018

(65) Prior Publication Data
US 2020/0333504 A1    Oct. 22, 2020

(30) Foreign Application Priority Data
Sep. 27, 2016   (CN) .......................... 201610855267.8

(51) Int. Cl.
*G01V 8/00*   (2006.01)
*G01S 13/90*  (2006.01)
(Continued)

(52) U.S. Cl.
CPC ............ *G01V 8/005* (2013.01); *G01S 13/887* (2013.01); *G01S 13/9027* (2019.05)

(58) Field of Classification Search
CPC ... G01V 8/005; G01S 13/9027; G01S 13/887; G01S 13/9029; G01N 21/3581
See application file for complete search history.

(56) References Cited

U.S. PATENT DOCUMENTS 6,570,956 B1 * 5/2003 Rhee ...................... G01S 13/887
378/57
7,386,150 B2 * 6/2008 Fleisher ................ G01S 13/887
342/22
(Continued)

FOREIGN PATENT DOCUMENTS

| CN | 102629315 A | 8/2012 |
| CN | 104459822 A | 3/2015 |

(Continued)

OTHER PUBLICATIONS

"Xinhua Dictionary with English Translation"; p. 286, left column, third entry from the top; published by the Xinhua News Agency; Peking, China; year 2000. (Year: 2000).*

*Primary Examiner* — Bernarr E Gregory
(74) *Attorney, Agent, or Firm* — Maier & Maier, PLLC (57) ABSTRACT

A millimeter wave image based human body foreign object detection method, comprising: acquiring a millimeter wave gray scale image of a human body; according to a predetermined foreign object imaging characteristic, extracting from the millimeter wave gray scale image a foreign object area image; according to a pre-determined foreign object image recognition algorithm, performing calculations on the (Continued)

foreign object area image, and acquiring a foreign object image from the foreign object area image; displaying the foreign object image as a foreign object detection result. Also provided is a millimeter wave image based human body foreign object detection system.

8 Claims, 6 Drawing Sheets

(51) Int. Cl.
     *G01S 13/88*     (2006.01)
     *G01S 13/00*     (2006.01)

(56) References Cited

U.S. PATENT DOCUMENTS

| | | | |
|---|---|---|---|
| 7,834,802 B2 * | 11/2010 | Keller | G01S 13/887 342/22 |
| 8,116,520 B2 | 2/2012 | Reinpoldt, III | |
| 2005/0110672 A1 * | 5/2005 | Cardiasmenos | G01N 21/3581 342/27 |
| 2009/0073023 A1 * | 3/2009 | Ammar | G01S 13/887 342/22 |
| 2010/0288930 A1 * | 11/2010 | Kersting | G01N 21/3581 250/341.8 |
| 2011/0102235 A1 * | 5/2011 | Abdillah | G01S 13/887 342/22 |
| 2011/0260905 A1 * | 10/2011 | Uemura | G01V 8/005 342/22 |

FOREIGN PATENT DOCUMENTS

| | | | | |
|---|---|---|---|---|
| CN | 105513035 A | 4/2016 | | |
| CN | 106371148 A | 2/2017 | | |
| EP | 2322950 A1 * | 5/2011 | | G01S 13/887 |
| JP | H1183996 A | 3/1999 | | |
| JP | 2006258496 A | 9/2006 | | |
| KR | 20090092660 A | 9/2009 | | |

* cited by examiner

MILLIMETER WAVE IMAGE BASED HUMAN BODY FOREIGN OBJECT DETECTION METHOD AND SYSTEM

CROSS-REFERENCE TO RELATED APPLICATION(S)

This application is a 371 application of International Application No. PCT/CN2017/096101, filed on Aug. 4, 2017, which claims priority to Chinese Patent Application No. 201610855267.8, filed on Sep. 27, 2016, the contents of both of which are herein incorporated by reference in their entireties.

BACKGROUND OF THE INVENTION

Technical Field

The embodiments of the present invention belong to the field of millimeter wave imaging technology, more particularly, to a millimeter wave image based human body foreign object detection method and system.

Description of Related Art

The millimeter wave has a certain penetrability during propagation. The millimeter wave imaging technology can safely and conveniently obtain images of metal or non-metal objects covered by clothes and will not cause an ionization damage to a human body, so the technology can replace the traditional X-ray security inspection equipment and metal detectors to be used in security inspection equipment in public places such as subways, railway stations and airports.

However, existing security inspection equipment based on the millimeter wave imaging technology usually directly detects a foreign object in a human body according to the gray scale characteristic of the obtained millimeter wave image of the human body; because the millimeter wave image has a low level of the gray scale, low definition, and an obvious coherent lenticular noise, it is not ideal to detect a foreign object by directly using the gray scale characteristic of the millimeter wave gray scale image of a human body.

BRIEF SUMMARY OF THE INVENTION

The embodiments of the present invention provide a millimeter wave image based human body foreign object detection method and system, aimed at solving the problem that it is not ideal to detect a foreign object in a human body by existing millimeter wave imaging technology based security inspection equipment directly according to the gray scale characteristic of the obtained millimeter wave image of the human body.

In one aspect, the embodiments of the present invention provide a method for millimeter wave image based human body foreign object detection, comprising:

acquiring a millimeter wave gray scale image of a human body;

according to a pre-determined foreign object imaging characteristic, extracting from the millimeter wave gray scale image a foreign object area image;

performing calculations on the foreign object area image according to a pre-determined foreign object image recognition algorithm, and acquiring a foreign object image from the foreign object area image;

displaying the foreign object image as a foreign object detection result.

Also provided is a system for millimeter wave image based human body foreign object detection, comprising:

a human body gray image acquirer, used for acquiring a millimeter wave gray scale image of a human body;

a foreign object area image extractor, used for, according to a pre-determined foreign object imaging characteristic, extracting from the millimeter wave gray scale image a foreign object area image;

a foreign object image calculator, used for performing calculations on the foreign object area image according to a pre-determined foreign object image recognition algorithm, and acquiring a foreign object image from the foreign object area image;

a displayer, used for displaying the foreign object image as a foreign object detection result.

The embodiments of the present invention greatly improve the accuracy of foreign object detection by acquiring a millimeter wave gray scale image of a human body; according to a pre-determined foreign object imaging characteristic, extracting from the millimeter wave gray scale image a foreign object area image; performing calculations on the foreign object area image according to a pre-determined foreign object image recognition algorithm, and acquiring a foreign object image from the foreign object area image.

DETAILED DESCRIPTION OF THE INVENTION

To enable those skilled in the art to better understand the solution of the present invention, a clear description will be given hereinafter to the technical solution of the embodiments of the present invention, in combination with the drawings of the embodiments. Obviously, the embodiments described are only part of but not all the embodiments of the present invention. All other embodiments obtained by those skilled in the field based on the embodiments of the present invention without paying creative effort should be within the protection scope of the present invention.

The term "comprise" and the variations thereof in the specifications, claims and the above drawings of the present invention are intended to cover a non-exclusive inclusion.

For example, a process, method or system, product or device comprising a series of steps or units is not limited to the listed steps, modules or units, but optionally further includes steps, modules or units not listed, or optionally further includes other steps, modules or units inherent to the process, method, product or device.

Embodiment 1

Figure 1:
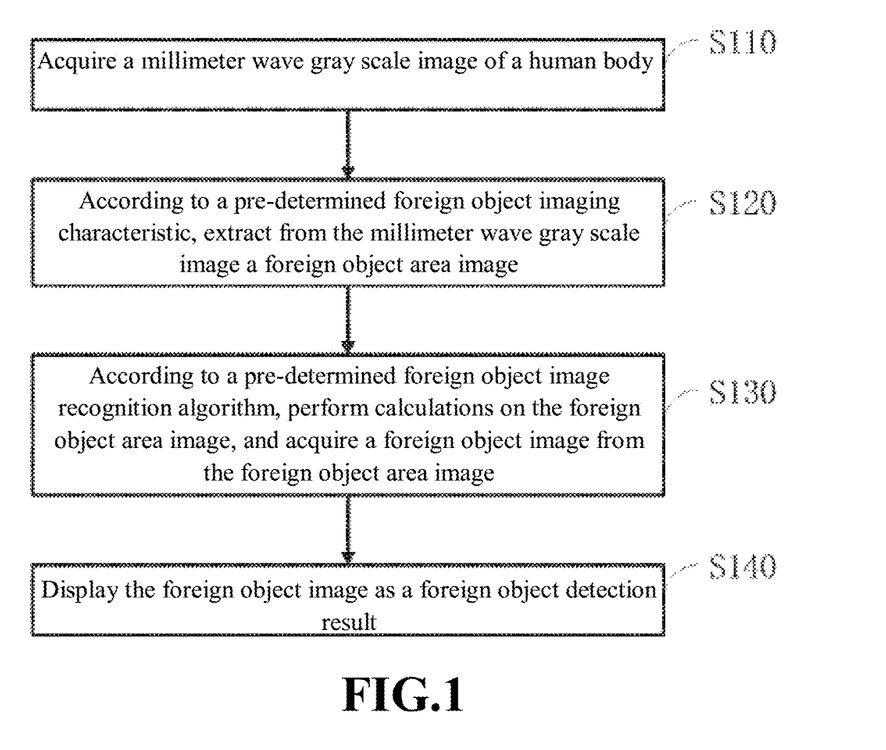
FIG. 1 is a basic flow chart of the method for millimeter wave image based human body foreign object detection according to Embodiment 1 of the present invention.

FIG. 1 shows the method for millimeter wave image based human body foreign object detection according to the embodiment, comprising:

Step S110: acquiring a millimeter wave gray scale image of a human body.

In a specific application, a human body may stand with hands raised overhead or raised to the same height as the shoulders, or dropping naturally, or stand in other standing postures which meet the security inspection standards. The embodiment of the invention does not specifically limit the standing posture of a human body, and then uses a millimeter wave data collecting device (such as a millimeter wave transceiver) to acquire millimeter wave data of the front or back of a human body and uses a millimeter wave imaging system (such as a millimeter wave imaging instrument) to process the millimeter wave data of a human body into a millimeter wave gray scale image of the front or back of a human body.

In this embodiment, the millimeter wave gray scale image of a human body refers to a millimeter wave gray scale image comprising only a human body contour area • not comprising a human body clothing image and a background image, or a millimeter wave gray scale image in which a human body contour area is placed on a solid color background.

Figure 2:
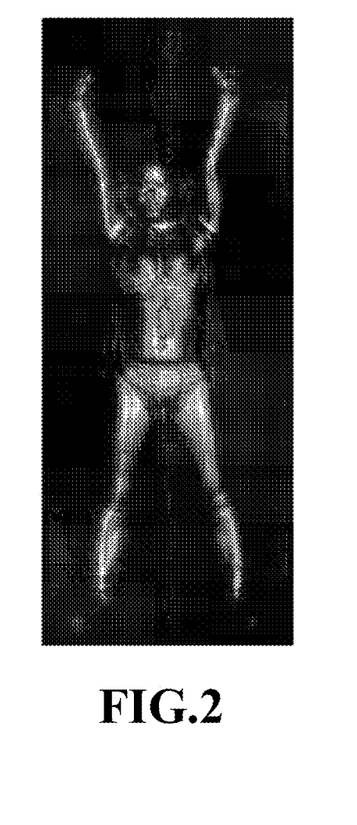
FIG. 2 is a schematic diagram of the millimeter wave gray scale image according to Embodiment 1 of the present invention.

FIG. 2 shows a millimeter wave gray scale image of a human body taken for an adult male with hands raised overhead.

Step S120: according to a pre-determined foreign object imaging characteristic, extracting from the millimeter wave gray scale image a foreign object area image.

In a specific application, the foreign object may be a metallic foreign object such as a metal gun, a cutter or a gold nugget, or may be a non-metallic foreign object such as a chemical agent, an ivory or a jade.

In an embodiment, the pre-set foreign object imaging characteristic specifically refers to:

determining, in the millimeter wave gray image, an area in which the gray scale value is greater than the pre-set gray scale threshold and the contour is clearly-defined as a metallic foreign object;

determining a complex texture and well-defined geometrical area in the millimeter wave gray scale image as a non-metallic foreign object.

In an embodiment, the millimeter wave gray scale image is acquired based on a millimeter wave Synthetic Aperture Radar (SAR) imaging technology, and correspondingly, the pre-set foreign object imaging characteristic specifically refers to:

identifying foreign objects according to the imaging characteristic of the millimeter wave SAR imaging technology, i.e., the millimeter wave SAR images of different objects have different characteristics of speckle noise, and thus extracting a foreign object area image in the millimeter wave gray image.

In an embodiment, Step S120 further comprises:

Step S121: controlling a pre-set window to slide and search on the millimeter wave gray scale image;

Step S122: extracting a window area image which meets the requirement of the pre-set foreign object imaging characteristic as the foreign object area image.

In a specific application, the size and shape of the pre-set window can be pre-set according to actual needs, for example, according to the pixel size of the contour area of a human body in the acquired millimeter wave gray scale image. In this embodiment, a rectangular window having a pixel size of 80*80 is selected.

Figure 3:
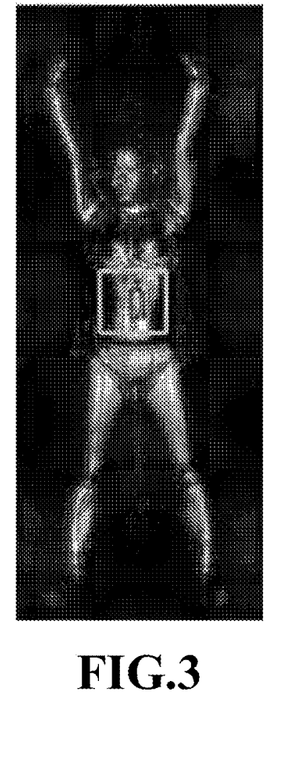
FIG. 3 is a schematic diagram of the foreign object area image according to Embodiment 1 of the present invention.

FIG. 3 shows an image of a foreign object area searched through a rectangular window.

In a specific application, Step S121 specifically comprises:

controlling the pre-set window to slide and search on the millimeter wave gray scale image at a pre-set stepping speed.

In a specific application, the pre-set stepping speed can be set according to actual needs; in this embodiment, the speed is set to 20 pixels per step of moving the window.

In a specific application, the size of the pre-set window and the stepping speed determine the scanning accuracy when the pre-set window sliding and searching on the millimeter wave gray image; the smaller the size of the pre-set window is and the slower the stepping speed is, the higher the scanning accuracy is.

In a specific application, Step S121 specifically further comprises:

controlling the pre-set window to slide and search on the millimeter wave gray scale image at a pre-set stepping speed according to a pre-set searching path.

In a specific application, the pre-set searching path may be determined by the size and shape of the pre-set window and the size of the human contour area on the millimeter wave gray scale image: if the width of the pre-set window is greater than or equal to the maximum width of the contour area of a human body, the preset window can straightly slide and search to the bottom from the top of the contour area of the human body; if the length of the pre-set window is greater than or equal to the maximum length of the contour area of a human body, the pre-set window can slide and search from the left side of the contour area of the human body to the right side. In this embodiment, a rectangular window having a length and a width smaller than the length and width of the contour area of a human body is used, and the pre-set window is configured to search step by step from the left to the right and from the top to the bottom in a broken-line-slide searching mode according to a " ㄹ " pattern.

In an embodiment, Step S122 further comprises:

Step S123: adjusting the size or shape of the preset window, if the window area image which meets the requirement of the pre-set foreign object imaging characteristic is not searched;

Step S124: controlling the window of an adjusted size or shape to slide and search on the millimeter wave gray scale image again.

In a specific application, the reason why the window area image which meets the requirement of the pre-set foreign object imaging characteristic is not searched may also be attributed to the fact that the searching path may not be ideal or the stepping speed is too fast; therefore, after Step S122, the method may further comprise: adjusting the pre-set stepping speed or the pre-set searching path, if the window area image which meets the requirement of the pre-set foreign object imaging characteristic is not searched.

Step S130: performing calculations on the foreign object area image according to a pre-determined foreign object image recognition algorithm, and acquiring a foreign object image from the foreign object area image.

In a specific application, the foreign object area image may be classified into a background pixel area, a possible background pixel area, a target pixel area and a possible target pixel area; then each pixel point is divided into different areas by performing calculation on the pixel characteristic of all pixel points in the foreign object area image; whether the pixel points in the possible target pixel area belong to the target pixel area is determined by an accurate classifying and dividing calculation; finally, all the pixels belonging to the target pixel area are restored to a digital image, that is, a foreign object image is obtained.

Step S140: displaying the foreign object image as a foreign object detection result.

In a specific application, when a foreign object image is displayed, only the target pixel area in the window is displayed, and the background pixel area is replaced with a solid color background.

Figure 4:
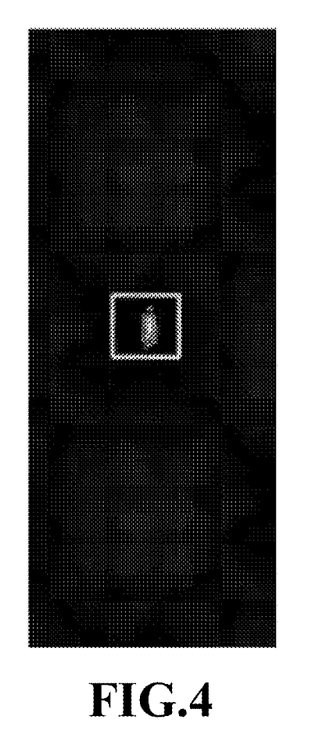
FIG. 4 is a schematic diagram of the foreign object image according to Embodiment 1 of the present invention.

FIG. 4 shows a foreign object image obtained upon calculation processing.

The embodiment greatly improves the accuracy of the foreign object detection by acquiring a millimeter wave gray scale image of a human body; according to a pre-determined foreign object imaging characteristic, extracting from the millimeter wave gray scale image a foreign object area image; according to a pre-determined foreign object image recognition algorithm, performing calculations on the foreign object area image, and acquiring a foreign object image from the foreign object area image.

Embodiment 2

Figure 5:
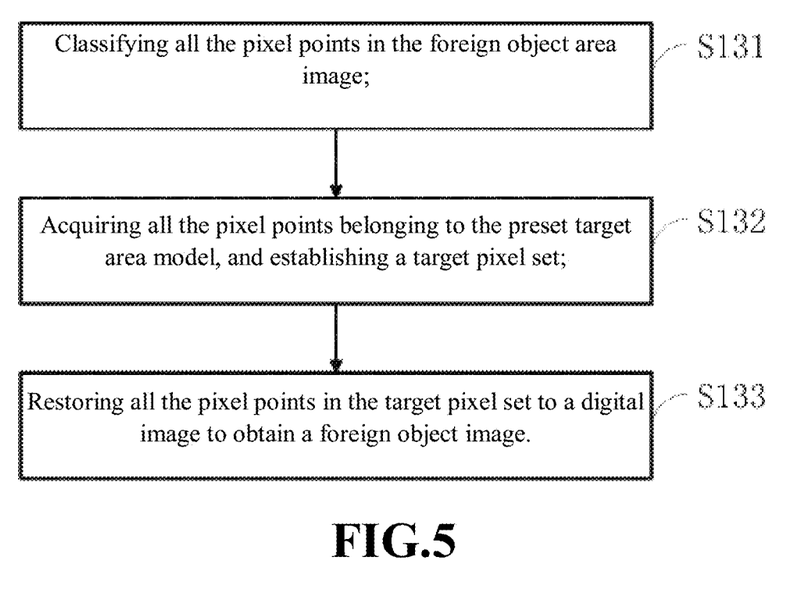
FIG. 5 is a block diagram showing the flow of Step S130 according to Embodiment 2 of the present invention.

As shown in FIG. 5, this embodiment further describes Step S130 in Embodiment 1 in detail.

In a specific application, the preset foreign object image recognition algorithm in Step S130 is an image segmentation algorithm.

Step S130 comprises:

Step S131: classifying all the pixels in the foreign object area image.

In a specific application, according to the RGB values of all the pixel points in the foreign object area image, all the pixels in the foreign object area image may be classified into at least two categories according to a preset classifying model, wherein the preset classifying model comprises at least a preset target area model and a preset background area model. In a specific application, more categories may be comprised according to actual needs; for example, a possible background pixel area model and a possible target pixel area model may be comprised, and the RGB value characteristics of the pixels belonging to different models are different.

In this embodiment, the preset target area model is a model established according to the RGB value characteristic of the foreign object image.

Step S132: acquiring all the pixel points belonging to the pre-set target area model, and establishing a target pixel set;

Step S133: restoring all the pixel points in the target pixel set to a digital image to obtain a foreign object image.

In an embodiment, Step S132 further comprises:

if the target pixel set is an empty set, according to a pre-determined foreign object imaging characteristic, re-extracting from the millimeter wave gray scale image a foreign object area image.

In a specific application, the target pixel set being an empty set indicates that the pixel point which matches the RGB value characteristic of the foreign object image is not obtained, that is, the foreign object image is not acquired; therefore, the foreign object area image in the millimeter wave gray image needs to be re-extracted; then, the foreign object image is obtained by using the pre-determined foreign object image recognition algorithm.

In this embodiment, the image segmentation algorithm is specifically a clustering algorithm (K-means); correspondingly, Step S130 may specifically comprise the following steps:

acquiring the RGB values of all the pixels in the foreign object area image;

fit-modeling the foreign object area image by using a Gaussian Mixture Model (GMM) including a preset number of Gaussian models;

determining the Gaussian model corresponding to each pixel point according to the RGB values of all the pixel points;

according to the Gaussian model corresponding to each pixel, acquiring the pixel points belonging to the target Gaussian model, and restoring the pixel points belonging to the target Gaussian model to a digital image, that is, a foreign object image is obtained.

In a specific application, the preset number may be set according to actual needs, and is preferably five in this embodiment, that is, a Gaussian mixture model including five Gaussian models is used to represent the RGB value characteristic of all the pixel points in the foreign object area image.

In a specific application, the calculating method for obtaining the pixel points belonging to the target Gaussian model is specifically:

setting the Gibbs energy of the entire foreign object area image as $$E(\underline{a},k,\underline{\theta},z)=U(\underline{a},k,\underline{\theta},z)+V(\underline{a},z);$$

setting the energy of all the pixels in the target area U as $$U(\underline{a}, k, \underline{\theta}, z) = \sum_n D(\underline{a}_n, k_n, \underline{\theta}, z_n);$$

setting the energy of the boundary pixels of the target area U as $$V(\underline{a}, z) = \gamma \sum_{(m,n)\in C} [a_n \neq a_m]\exp-\beta\|z_n - z_m\|^2;$$

then, the energy of the pixel points belonging to the target Gaussian model to be calculated is $$D(\underline{a}_v, k_n, \underline{\theta}, z_n) = -\log\pi(\alpha_v, \kappa_n) + \frac{1}{2}\log\det\sum(\alpha_v, \kappa_n) +$$
$$\frac{1}{2}[z_n - \mu(\alpha_v, \kappa_n)]^T \sum(\alpha_v, \kappa_n)^{-1}[z_n - \mu(\alpha_v, \kappa_n)],$$

wherein $\underline{\theta} = [\pi(a, k), \mu(a, k), \sum(a, k), a = 0, 1, k = 1 \ldots K]$.

In a specific application, β is related to the contrast of the foreign object area image itself; preferably, the parameter is γ=40 in this embodiment.

In a specific application, the energy of the boundary pixel can reflect the degree of discontinuity between the pixel points of m and n in the adjacent areas: if the energy difference between two adjacent pixels is small, the pixels are highly likely belong to the same target area or the same background area; if the energy difference between two adjacent pixels is large, the pixels are less possible belong to the same target area or the same background area. In this embodiment, according to the energy difference characteristic of the adjacent boundary pixels, the foreign object area image is clustered and segmented to obtain all the pixels belonging to the target Gaussian model.

In this embodiment, the foreign object area image is segmented according to the image segmentation algorithm, and the pixel points belonging to the foreign object image in the foreign object area image are distinguished from the pixel points belonging to the background to obtain the pixel points belonging to the foreign object image, which are then restored to a foreign object image.

Embodiment 3

Figure 6:
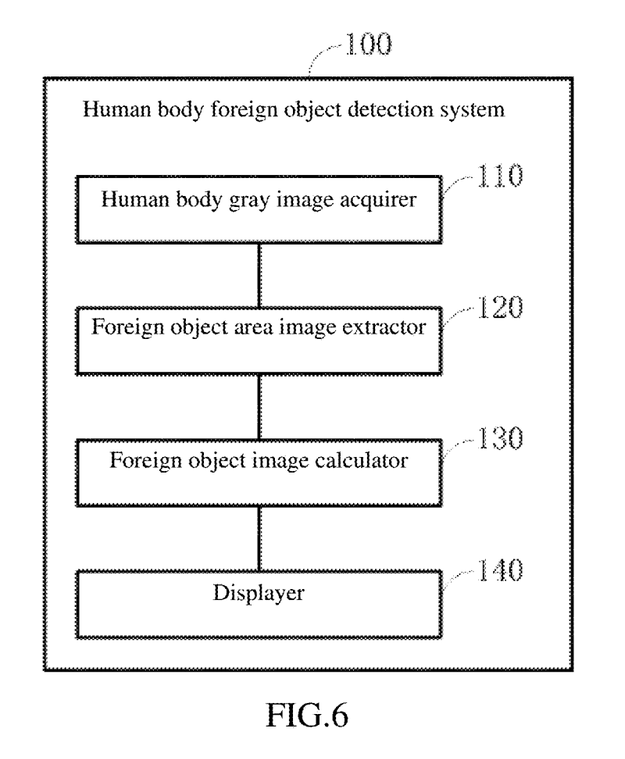
FIG. 6 is a block diagram showing the basic structure of the system for millimeter wave image based human body foreign object detection according to Embodiment 3 of the present invention.

As shown in FIG. 6, the millimeter wave image based human body foreign object detection system 100 according to the embodiment, used for executing the steps in the embodiment corresponding to FIG. 1, comprises:

a human body gray image acquirer 110, used for acquiring a millimeter wave gray scale image of a human body;

a foreign object area image extractor 120, used for, according to a pre-determined foreign object imaging characteristic, extracting from the millimeter wave gray scale image a foreign object area image;

a foreign object image calculator 130, used for, performing calculations on the foreign object area image according to a pre-determined foreign object image recognition algorithm, and acquiring a foreign object image from the foreign object area image;

a displayer 140, used for displaying the foreign object image as a foreign object detection result.

In a specific application, the human body gray image acquirer 110 comprises a millimeter wave transceiver and a millimeter wave imaging instrument; the foreign object region image extracting module 120 and the foreign object image calculator 130 may be image processing chips; the displayer 140 is a display device, such as a liquid crystal or LED display.

In an embodiment, the foreign object area image extractor 120 comprises:

a window searcher, used for controlling a preset window to slide and search on the millimeter wave gray scale image;

an window area image extractor, used for extracting a window area image which meets the requirement of a preset foreign object imaging characteristic as the foreign object area image.

In another embodiment, the foreign object area image extractor 120 further comprises:

a window adjuster, used for adjusting the size or shape of the preset window, if the window area image which meets the requirement of the preset foreign object imaging characteristic is not searched;

The window searcher is further used for controlling the window of an adjusted size or shape to slide and search on the millimeter wave gray scale image again.

In a specific application, the window searcher is specifically used for:

controlling the pre-set window to slide and search on the millimeter wave gray scale image at a pre-set stepping speed.

In a specific application, the pre-set stepping speed can be set according to actual needs; in this embodiment, the speed is set to 20 pixels per step of moving the window.

In a specific application, the size of the preset window and the stepping speed determine the scanning accuracy when the preset window sliding and searching on the millimeter wave gray image; the smaller the size of the pre-set window is and the slower the stepping speed is, the higher the scanning accuracy is.

In a specific application, the window searcher is specifically further used for:

controlling the pre-set window to slide and search on the millimeter wave gray scale image at a pre-set stepping speed according to a pre-set searching path.

In a specific application, the pre-set searching path may be determined by the size and shape of the pre-set window and the size of the human contour area on the millimeter wave gray scale image: if the width of the pre-set window is greater than or equal to the maximum width of the contour area of a human body, the pre-set window can straightly slide and search to the bottom from the top of the contour area of the human body; if the length of the pre-set window is greater than or equal to the maximum length of the contour area of a human body, the preset window can slide and search from the left side of the contour area of the human body to the right side. In this embodiment, a rectangular window having a length and a width smaller than the length and width of the contour area of a human body is used, and the pre-set window is configured to search step by step from the left to the right and from the top to the bottom in a broken-line-slide searching mode according to a "己" pattern.

In an embodiment, a window adjuster is used for adjusting the size or shape of the pre-set window, if the window area image which meets the requirement of the pre-set foreign object imaging characteristic is not searched;

The window searcher is further used for controlling the window of an adjusted size or shape to slide and search on the millimeter wave gray scale image again.

In a specific application, the reason why the window area image which meets the requirement of the pre-set foreign object imaging characteristic is not searched may also be attributed to the fact that the searching path may not be ideal or the stepping speed is too fast; therefore, the window adjuster is further used for adjusting the preset stepping speed or the pre-set searching path, if the window area image which meets the requirement of the pre-set foreign object imaging characteristic is not searched.

The embodiment greatly improves the accuracy of the foreign object detection by acquiring a millimeter wave gray scale image of a human body; according to a pre-determined foreign object imaging characteristic, extracting from the millimeter wave gray scale image a foreign object area image; according to a pre-determined foreign object image recognition algorithm, performing calculations on the foreign object area image, and acquiring a foreign object image from the foreign object area image.

Embodiment 4

Figure 7:
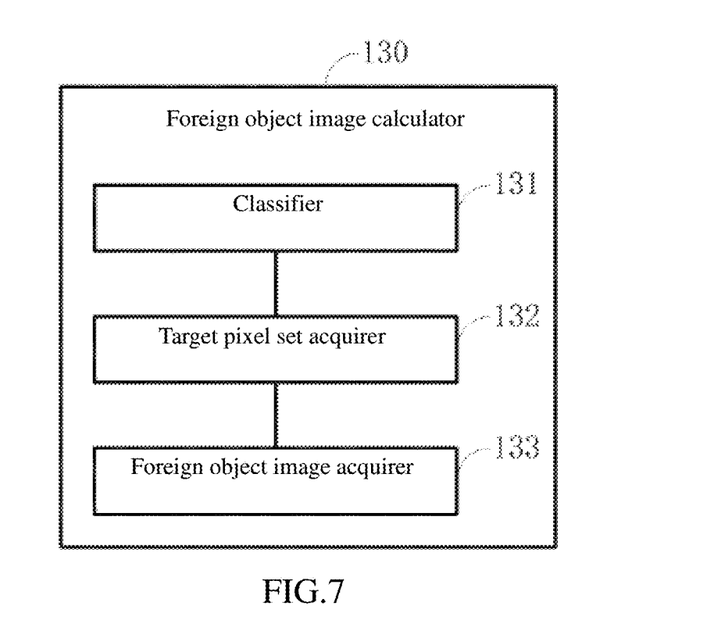
FIG. 7 is a block diagram showing the structure of the foreign object image calculator according to Embodiment 4 of the present invention.

As shown in FIG. 7, the foreign object image calculator 130 provided in this embodiment is used for executing the steps of the method in the embodiment corresponding to FIG. 5.

In this embodiment, the pre-set foreign object image recognition algorithm is an image segmentation algorithm;

Correspondingly, the foreign object image calculator 130 comprises:

a classifier 131, used for classifying all the pixel points in the foreign object area image;

a target pixel set acquirer 132, used for acquiring all the pixel points belonging to the pre-set target area model, and establishing a target pixel set;

a foreign object image acquirer 133, used for restoring all the pixel points in the target pixel set to a digital image to obtain a foreign object image.

In an embodiment, the foreign object area image extractor 120 is further used for:

if the target pixel set is an empty set, according to a pre-determined foreign object imaging characteristic, re-extracting from the millimeter wave gray scale image a foreign object area image.

In a specific application, the target pixel set being an empty set indicates that the pixel point which matches the RGB value characteristic of the foreign object image is not obtained, that is the foreign object image is not acquired; therefore, the foreign object area image in the millimeter wave gray image needs to be re-extracted; then, the foreign object image is obtained using the pre-determined foreign object image recognition algorithm.

In this embodiment, the image segmentation algorithm is specifically a clustering algorithm (K-means); correspondingly, the foreign object image calculator 130 may specifically comprise:

a RGB value acquiring unit, used for acquiring the RGB values of all the pixels in the foreign object area image;

a modeling unit, used for fit-modeling the foreign object area image by using a Gaussian Mixture Model (GMM) including a preset number of Gaussian models;

a determining unit, used for determining the Gaussian model corresponding to each pixel point according to the RGB values of all the pixel points;

a foreign object image acquirer, used for: according to the Gaussian model corresponding to each pixel, acquiring the pixel points belonging to the target Gaussian model, and restoring the pixel points belonging to the target Gaussian model to a digital image, that is, a foreign object image is obtained.

In this embodiment, the foreign object area image is segmented by the image segmentation algorithm, and the pixel points belonging to the foreign object image in the foreign object area image are distinguished from the pixel points belonging to the background to obtain the pixel points belonging to the foreign object image, which are then restored to a foreign object image.

The modules or units in all embodiments of the present invention can be implemented by a general-purpose integrated circuit, such as a Central Processing Unit (CPU), or by an Application Specific Integrated Circuit (ASIC).

The steps of the method in the embodiment of the present invention may be sequentially adjusted, combined and deleted according to actual needs.

The modules or units of the system in the embodiment of the present invention may be combined, divided and deleted according to actual needs; the function of each module or unit of the system is corresponding to the steps of the method, and the technical characteristics in the system may be increased according to those recorded in the steps of the method.

Those skilled in the art can understand that all or part of the process of implementing the foregoing embodiments can be completed by a computer program to instruct a related hardware, and the program can be stored in a computer's readable storage medium. When executing the program, the flow of an embodiment of the methods as described above may be included. The storage medium may be a magnetic disk, an optical disk, a Read-Only Memory (ROM) or a Random Access Memory (RAM), etc.

The foregoing are only preferred embodiments of the present invention and are not intended to limit the invention, and any modifications, equivalent substitutions and improvements based on the spirit and principle of the invention shall be within the protection scope of the present invention.

What is claimed is:

1. A millimeter wave image based human body foreign object detection method, comprising:

acquiring a millimeter wave gray scale image of a human body;

according to a pre-determined foreign object imaging characteristic, extracting from the millimeter wave gray scale image a foreign object area image;

performing calculations on the foreign object area image according to a pre-determined foreign object image recognition algorithm, and acquiring a foreign object image from the foreign object area image; and displaying the foreign object image as a foreign object detection result;

wherein, an area with a clearly-defined contour in the millimeter wave gray scale image in which the gray scale value is greater than a preset gray scale threshold is determined as a metallic foreign object area, and a complex texture and well-defined geometrical area in the millimeter wave gray scale image is determined as a non-metallic foreign object area;

wherein, extracting from the millimeter wave gray scale a foreign object area image comprises:

controlling a preset window to slide and search on the millimeter wave gray scale image at a preset stepping speed according to a preset searching path;

extracting a window area image which meets the requirement of the pre-determined foreign object imaging characteristic as the foreign object area image;

adjusting the preset stepping speed or the preset searching path, if the window area image which meets the requirement of the pre-determined foreign object imaging characteristic is not searched.

2. The millimeter wave image based human body foreign object detection method of claim 1, further comprising:

after controlling the preset window to slide and search on the millimeter wave gray scale image:

adjusting the size or shape of the preset window, if the window area image which meets the requirement of the pre-determined foreign object imaging characteristic is not searched; and controlling the window of an adjusted size or shape to slide and search on the millimeter wave gray scale image again.

3. The millimeter wave image based human body foreign object detection method of claim 1, wherein:

the pre-determined foreign object image recognition algorithm is an image segmentation algorithm; and performing calculations on the foreign object area image according to the pre-determined foreign object image recognition algorithm and acquiring the foreign object image from the foreign object area image comprises:

classifying all the pixel points in the foreign object area image;

acquiring all the pixel points belonging to a pre-set target area model, and establishing a target pixel set; and restoring all the pixel points in the target pixel set to a digital image to obtain a foreign object image.

4. The millimeter wave image based human body foreign object detection method of claim 3, further comprising:
   after acquiring all the pixel points belonging to the preset target area model and establishing a target pixel set:
   based on a determination the target pixel set is an empty set, according to a pre-determined foreign object imaging characteristic,
   re-extracting from the millimeter wave gray scale image a foreign object area image.

5. A millimeter wave image based human body foreign object detection system, comprising:
   a human body gray image acquirer, comprising a millimeter wave transceiver and a millimeter wave imaging instrument, and configured to acquire a millimeter wave gray scale image of a human body;
   a foreign object area image extractor, configured to, according to a pre-determined foreign object imaging characteristic, extract from the millimeter wave gray scale image a foreign object area image;
   a foreign object image calculator, configured to perform calculations on the foreign object area image according to a pre-determined foreign object image recognition algorithm, and acquire a foreign object image from the foreign object area image; and
   a displayer, configured to display the foreign object image as a foreign object detection result;
   wherein, an area with a clearly-defined contour in the millimeter wave gray scale image in which the gray scale value is greater than a preset gray scale threshold is determined as a metallic foreign object area, and a complex texture and well-defined geometrical area in the millimeter wave gray scale image is determined as a non-metallic foreign object area;
   wherein the foreign object area image extractor comprises:
   a window searcher, configured to control the preset window to slide and search on the millimeter wave gray scale image at a preset stepping speed according to a preset searching path;
   a window area image extractor, configured to extract a window area image which meets the requirement of the pre-determined foreign object imaging characteristic as the foreign object area image; and
   a window adjustor, configured to adjust the preset stepping speed or the preset searching path, if the window area image which meets the requirement of the pre-determined foreign object imaging characteristic is not searched.

6. The millimeter wave image based human body foreign object detection system of claim 5, wherein the foreign object area image extractor further comprises:
   the window adjuster is further configured to adjust the size or shape of the preset window, if the window area image which meets the requirement of the pre-determined foreign object imaging characteristic is not searched; and
   the window searcher is further configured to control the window of an adjusted size or shape to slide and search on the millimeter wave gray scale image again.

7. The millimeter wave image based human body foreign object detection system of claim 5, wherein:
   the pre-set foreign object image recognition algorithm is an image segmentation algorithm; and
   the foreign object image calculator comprises: a classifier, configured to classify all the pixel points in the foreign object area image;
   a target pixel set acquirer, configured to acquire all the pixel points belonging to the pre-set target area model, and establish a target pixel set; and
   a foreign object image acquirer, configured to restore all the pixel points in the target pixel set to a digital image to obtain a foreign object image.

8. The millimeter wave image based human body foreign object detection system of claim 7, wherein the foreign object area image extractor is further configured to:
   based on a determination that the target pixel set is an empty set, according to a pre-determined foreign object imaging characteristic, re-extract from the millimeter wave gray scale image a foreign object area image.

* * * * *